United States Patent
Joo et al.

(10) Patent No.: US 9,564,798 B2
(45) Date of Patent: Feb. 7, 2017

(54) DISPLAY APPARATUS, POWER SUPPLY APPARATUS AND POWER SUPPLY METHOD THEREOF

(71) Applicant: SAMSUNG ELECTRONICS CO., LTD., Suwon-si (KR)

(72) Inventors: Sung-yong Joo, Yongin-si (KR); Jin-hyung Lee, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/755,501

(22) Filed: Jun. 30, 2015

(65) Prior Publication Data
US 2016/0043629 A1    Feb. 11, 2016

(30) Foreign Application Priority Data
Aug. 8, 2014 (KR) ........................ 10-2014-0102561

(51) Int. Cl.
| | |
|---|---|
| H02M 1/36 | (2007.01) |
| H02M 7/217 | (2006.01) |
| H02M 1/32 | (2007.01) |

(52) U.S. Cl.
CPC .............. *H02M 1/36* (2013.01); *H02M 7/217* (2013.01); *H02M 2001/322* (2013.01)

(58) Field of Classification Search
CPC ... H02M 1/36; H02M 2001/322; H02M 7/217
See application file for complete search history.

(56) References Cited

U.S. PATENT DOCUMENTS

| | | | |
|---|---|---|---|
| 2012/0134185 A1 | 5/2012 | Shin et al. | |
| 2012/0287684 A1* | 11/2012 | Fahlenkamp | ....... H02M 3/3376 363/49 |
| 2013/0188401 A1* | 7/2013 | Jin | ........................ H02H 3/14 363/21.17 |

FOREIGN PATENT DOCUMENTS

KR    1020120059129 A    6/2012

* cited by examiner

*Primary Examiner* — Jue Zhang
(74) *Attorney, Agent, or Firm* — Sughrue Mion, PLLC

(57) ABSTRACT

Disclosed is a display apparatus including an image processor configured to process an image signal, a display configured to display an image based on the image signal, a controller configured to control the display of the image, and a power supply configured to supply actuating power to the controller, the power supply including a power circuit configured to receive alternating current (AC) power and output the actuating power by a switching mode, a noise reducer configured to reduce high-frequency noise due to the switching mode, and a discharging circuit configured to supply a residual voltage of the noise reducer to the power circuit when the AC power is input, and discharge the residual voltage of the noise reducer when the AC power is shut off. Thus, it is possible to decrease power consumption caused when the residual voltage of the noise reducer is discharged.

15 Claims, 6 Drawing Sheets

DISPLAY APPARATUS, POWER SUPPLY APPARATUS AND POWER SUPPLY METHOD THEREOF

CROSS-REFERENCE TO RELATED APPLICATION

This application claims priority from Korean Patent Application No. 10-2014-0102561, filed on Aug. 8, 2014 in the Korean Intellectual Property Office, the disclosure of which is incorporated herein by reference.

BACKGROUND

Field

Apparatuses and methods consistent with the exemplary embodiments relate to a display apparatus, a power supply apparatus and a power supply method thereof, and more particularly to a display apparatus a power supply apparatus and a power supply method thereof, which can minimize wasteful consumption of power in a discharging device for discharging a residual voltage when alternating current (AC) power is shut off.

Description of the Related Art

A display apparatus such as a television (TV) operates by receiving power from an internal or external power supply. FIG. 1 is a circuit diagram of a power supply 1 of a display apparatus of the related art. Issues related to the power supply 1 of the display apparatus of the related art, to be described below, are not always publicly known. The power supply 1 shown in FIG. 1 may include a rectifier 12 for rectifying a current from AC power 11 in order to supply actuating power $V_{OUT}$ to a system 16, and a smoother 13 for smoothing the rectified DC voltage. The power supply 1 may further include a primary coil 14 to which the rectified input voltage $V_{IN}$ is supplied, and a secondary coil 15 from which an activating voltage induced by the primary coil 14 is output. In addition, the power supply 1 may include a switch 18 turned on or off so that a current can selectively flow in the primary coil 14, and a power integrated circuit (IC) 19 controlling the switch 18 to be turned on/off so that the activating voltage $V_{OUT}$ can be output at a desired level.

The power supply 1 may include a noise reducer, such as a capacitor or the like, to reduce high-frequency noise caused by control of the switching mode. The noise reducer may be charged with a considerably high voltage (hereinafter, referred to as a "residual voltage") during usual operation. Therefore, in order to protect a user from an electric shock, due to the residual voltage charged in the noise reducer, when the user pulls out a power cord, the power supply 1 may further include a discharger, such as a resistor, for discharging the residual voltage of the noise reducer.

However, if the discharger is always connected to the power supply 1, current may flow into the discharger when the AC power 11 is being supplied as well as when a user pulls out the power cord, i.e. when the AC power 11 is shut off, thereby causing a problem of wasteful power consumption.

In particular, even in a standby mode, in which the display apparatus is expected to lower the power consumption, the discharger consumes considerable amount of power, thereby causing a problem.

Such power consumption due to the discharger may occur not only in the display apparatus but also various electronic apparatuses having the foregoing structure for supplying power.

SUMMARY

An aspect of one or more exemplary embodiments may provide a power supply apparatus and a power supply method thereof, which can decrease power consumption caused when a residual voltage of a noise reducer is discharged.

Another aspect is to provide a display apparatus, a power supply apparatus and a power supply method thereof, which can further decrease power consumption caused when a residual voltage of a noise reducer is discharged in a standby mode.

According to an aspect of an exemplary embodiment, a display apparatus includes an image processor configured to process an image signal, a display configured to display an image based on the image signal, a controller communicating with the image processor and configured to control the display of the image, and a power supply configured to supply actuating power to the controller, the power supply includes a power circuit configured to receive alternating current (AC) power and output the actuating power using a switching mode, a noise reducer configured to reduce high-frequency noise due to the switching mode, and a discharging circuit configured to supply a residual voltage of the noise reducer to the power circuit when the AC power is input, and discharge the residual voltage of the noise reducer when the AC power is shut off.

According to another exemplary embodiment, the power circuit further includes a pulse width modulation (PWM) controller configured to control output of the actuating power using a PWM mode, wherein the controller is further configured to supply the residual voltage of the noise reducer to the PWM controller when the AC power is input.

According to another exemplary embodiment, the discharging circuit and the PWM controller are combined on a single integrated chip (IC).

According to another exemplary embodiment, the discharging circuit includes a charging capacitor, and a charger/discharger configured to charge the charging capacitor with the residual voltage of the noise reducer in sync with a cycle of the AC power when the AC power is input, and to discharge the power charged in the charging capacitor.

According to another exemplary embodiment, the discharging circuit includes a transistor configured to turn off when the AC power is input, to supply the residual voltage of the noise reducer to the power circuit, to turn on when the AC power is shut off and the voltage charged in the charging capacitor has a level equal to or higher than a threshold level and to reduce the residual voltage of the noise reducer to a ground.

According to an aspect of an exemplary embodiment, power supply apparatus for supplying actuating power to a display apparatus, the power supply apparatus includes a power circuit configured to receive alternating current (AC) power and output the actuating power using a switching mode, a noise reducer configured to reduce high-frequency noise due to the switching mode; and a discharging circuit configured to supply a residual voltage of the noise reducer to the power circuit when the AC power is input, and discharge the residual voltage of the noise reducer when the AC power is shut off.

According to another exemplary embodiment, the power circuit further comprises a pulse width modulation (PWM) controller configured to control output of the actuating power using a PWM mode.

According to another exemplary embodiment, the discharging circuit and the PWM controller are combined on a single integrated chip (IC).

According to another exemplary embodiment, the discharging circuit includes a charging capacitor, and a charger/discharger configured to charge the charging capacitor with the residual voltage of the noise reducer in sync with a cycle of the AC power when the AC power is input, and to discharge the power charged in the charging capacitor.

According to another exemplary embodiment, the discharging circuit includes a transistor configured to turn off when the AC power is input, to supply the residual voltage of the noise reducer to the power circuit, to turn on when the AC power is shut off and the voltage charged in the charging capacitor has a level equal to or higher than a threshold level, and to reduce the residual voltage of the noise reducer to a ground.

According to an aspect of an exemplary embodiment, a method of controlling a display apparatus which comprises a power supply for supplying actuating power and processing an image signal to display an image, wherein the power supply includes a power circuit configured to receive alternating current (AC) power and output the actuating power using a switching mode, and a noise reducer configured to reduce high-frequency noise due to the switching mode, and the method includes supplying a residual voltage of the noise reducer to the power circuit when the AC power is input, and discharging the residual voltage of the noise reducer when the AC power is shut off.

According to another exemplary embodiment, the power supply further includes a discharging circuit, and the supplying the residual voltage of the noise reducer further comprises charging a charging capacitor of the discharging circuit with the residual voltage of the noise reducer in sync with a cycle of the AC power when the AC power is input, and discharging the power charged in the charging capacitor.

According to an aspect of an exemplary embodiment, a method of controlling a power supply apparatus which comprises a power supply and supplies actuating power to a display apparatus processing an image signal and displaying an image, wherein the power supply includes a power circuit configured to receive alternating current (AC) power and output the actuating power using a switching mode, and a noise reducer configured to reduce high-frequency noise due to the switching mode, and the method includes supplying a residual voltage of the noise reducer to the power circuit, when the AC power is input, and discharging the residual voltage of the noise reducer, when the AC power is shut off.

According to another exemplary embodiment, the supplying the residual voltage of the noise reducer comprises charging a charging capacitor of a discharging circuit with the residual voltage of the noise reducer in sync with a cycle of the AC power when the AC power is input, and discharging the power charged in the charging capacitor.

According to an aspect of an exemplary embodiment, a method of controlling a power supply apparatus includes determining noise of a power source using a noise reducer and generating a residual voltage, when alternating current (AC) power is being input, supplying the residual voltage to a power circuit, and when the AC power is shut off, discharging the residual voltage.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION OF EXEMPLARY EMBODIMENTS

Below, exemplary embodiments will be described in detail with reference to accompanying drawings. The present disclosure may be achieved in various forms and not limited to the following embodiments. For convenience of description, parts not directly related to the present disclosure are omitted, and like numerals refer to like elements throughout.

Figure 1:
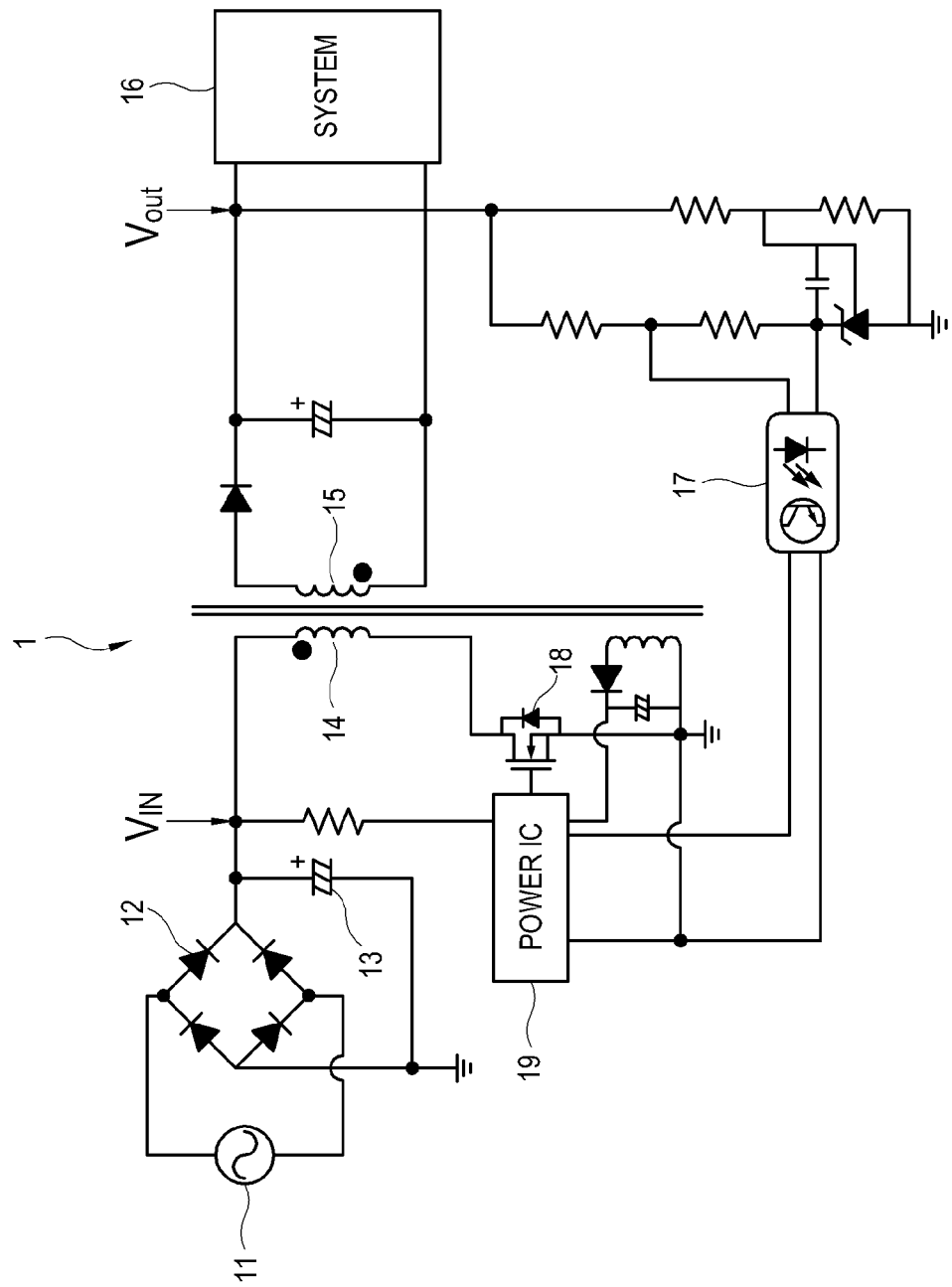
FIG. 1 is a circuit diagram of a power supply according to the related art, according to an exemplary embodiment.
Figure 2:
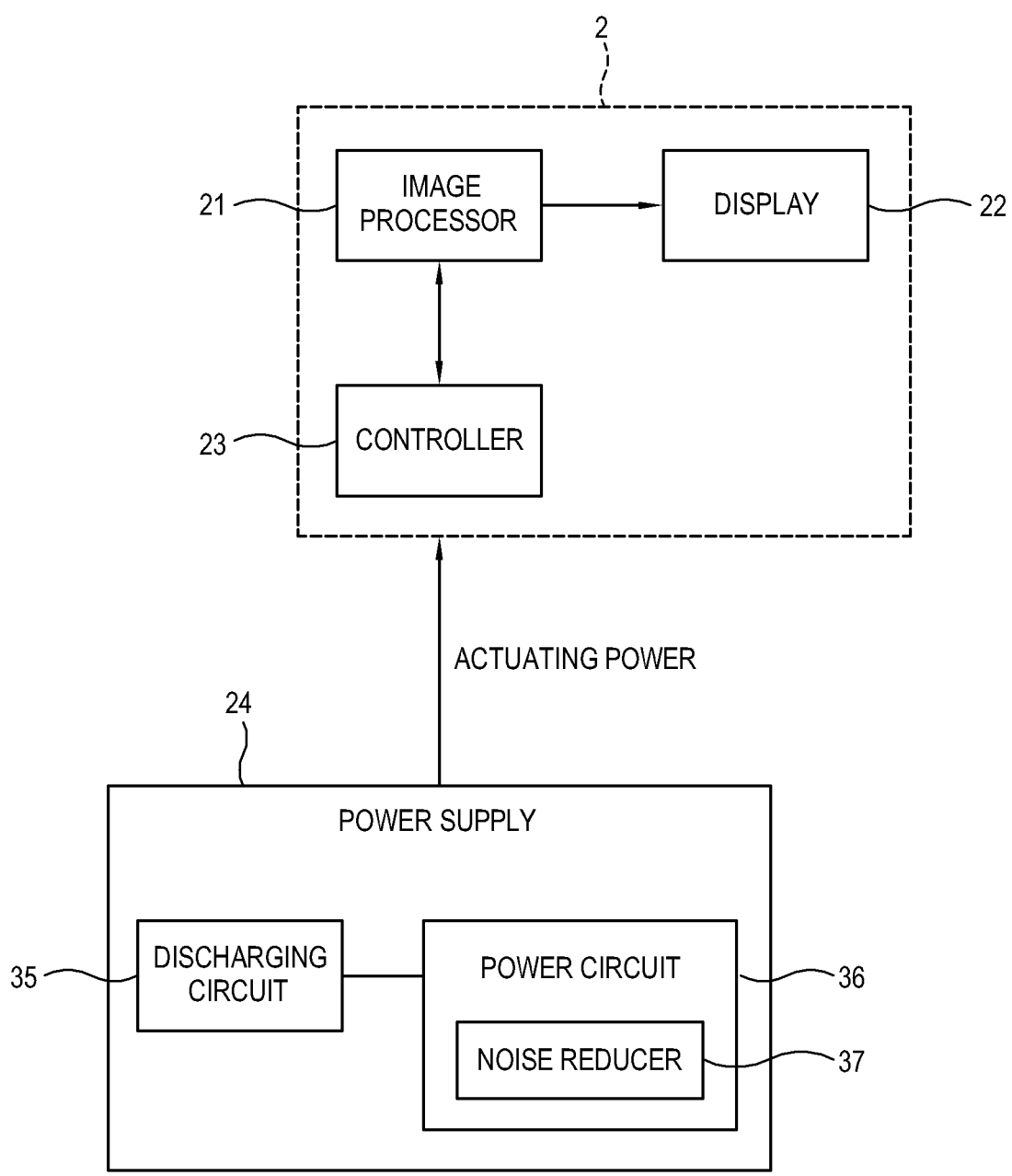
FIG. 2 is a block diagram of a display apparatus, according to an exemplary embodiment.

FIG. 2 is a block diagram of a display apparatus 2, according to an exemplary embodiment. Below, the display apparatus 2 will be described with reference to FIG. 2.

The display apparatus 2 may be implemented as a TV or the like, which receives and processes an image signal and displays an image based on the image signal. The display apparatus 2 may include a signal receiver, an image processor 21, a display 22, a controller 23 and a power supply 24. However, the elements of the display apparatus 2 shown in FIG. 2 are merely exemplary, and may vary. For example, although not shown, the display apparatus 2 may exclude at least one from the elements shown in FIG. 2, or may include additional elements.

The signal receiver receives an image signal. The signal receiver may include a tuner to receive an image signal such as a broadcast signal. Under control of the controller 23, the tuner may be tuned to one channel, selected from among a plurality of channels, and receive an image signal through the tuned channel. The channel may be selected by a user. Alternatively, the signal receiver may receive an image signal from a set-top box, a digital versatile disc (DVD) player, a personal computer (PC), or the like; from a Smart phone, or other peripheral device; or from the Internet or other network.

The image processor 21 performs a predetermined signal process to display the image signal as an image on the display 22. The signal process performed by the image processor 21 may, for example, include modulation, demodulation, multiplexing, de-multiplexing, analog-digital conversion, digital-analog conversion, decoding, encoding, image enhancement, scaling, etc.

The display 22 displays an image based an image signal processed by the image processor 21. The display 22 may display an image in various forms such as a liquid crystal display (LCD), a plasma display panel (PDP), an organic light emitting diode (OLED), etc. The display apparatus 2, according to an exemplary embodiment, has a normal mode where an image is displayed on the display 22, or the like, and normal operations are performed, and a standby mode where minimum power is consumed.

The controller 23 controls the signal receiver and the image processor 21 to display an image based on the received image signal. The controller 23 may include a control program for implementing such control, nonvolatile and volatile memories for storing the control program, and a microprocessor for executing the control program.

The power supply 24 may supply actuating power (hereinafter, referred to as the "power") to the controller 23. The power supply 24 may supply power to the signal receiver, the image processor 21, the display 22 and the controller 23. The power supply 24 includes a power circuit 36, a noise reducer 37 and a discharging circuit 35, according to an exemplary embodiment. The noise reducer 37 may be provided in the power circuit 36, according to an exemplary embodiment. The power supply 24 may be achieved by excluding some elements from the plurality of elements shown in FIG. 2, or including additional elements not shown in FIG. 2.

The power circuit 36 may receive the AC power and output the actuating power using a switching mode. For example, the power circuit 36 may include a pulse width modulation (PWM) controller 77 (shown in FIG. 4) that controls the output of the actuating power using a PWM mode.

The noise reducer 37 may reduce high-frequency noise by a switching operation of the power circuit 36.

The discharging circuit 35 supplies the residual voltage of the noise reducer 37 to the power circuit 36 when AC power is supplied, and discharges the residual voltage of the noise reducer 37 when AC power is shut off.

Figure 3:
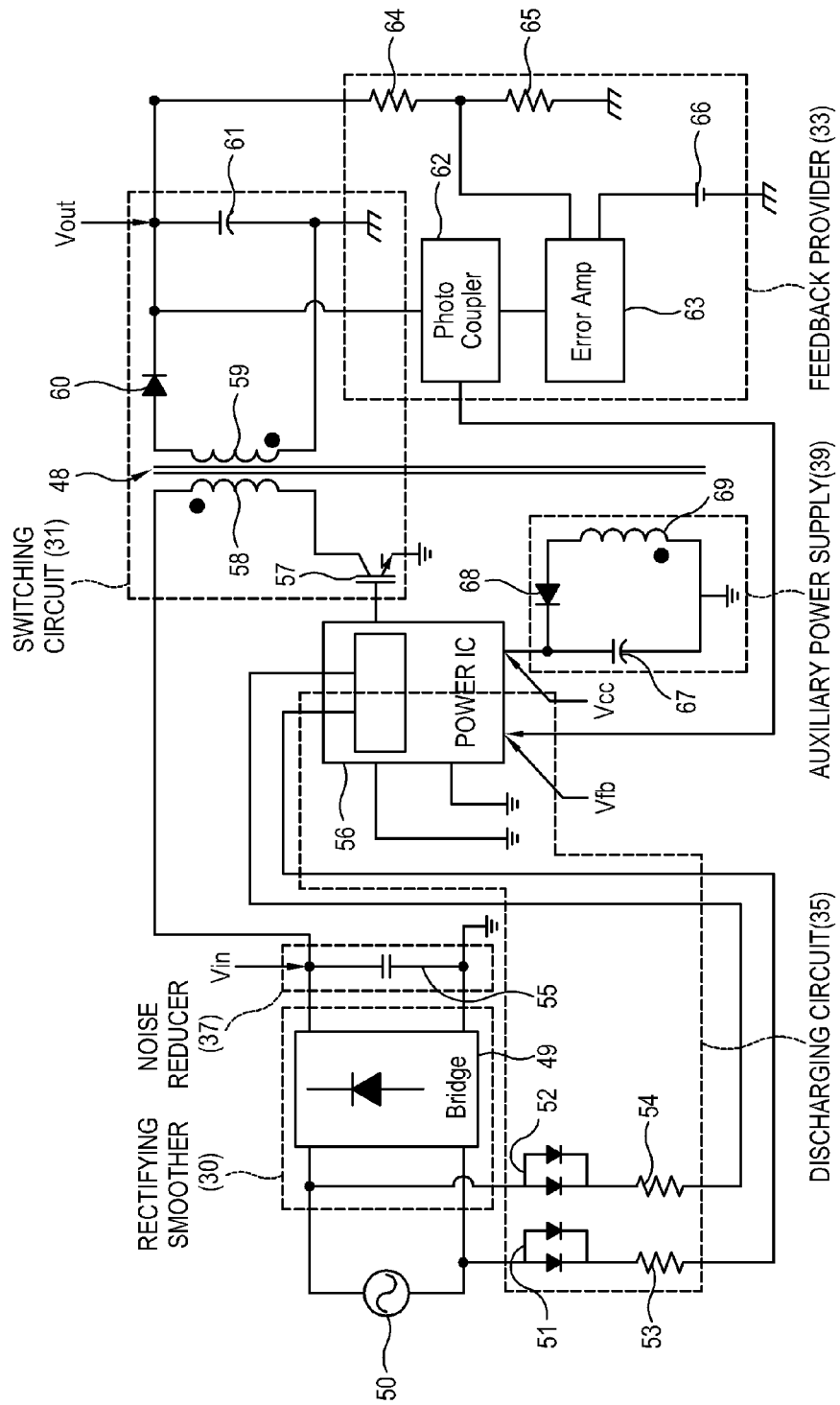
FIG. 3 is a circuit diagram of a power supply, according to an exemplary embodiment.

Some elements and the PWM controller 77 of the discharging circuit 3 may be implemented on a single integrated chip (IC), i.e. a power IC 56 (shown in FIG. 3).

FIG. 3 is a circuit diagram the power circuit 36 shown in FIG. 2, according to an exemplary embodiment. The power circuit 36 may include a rectifying smoother 30, a switching circuit 31, a feedback provider 33 and an auxiliary power supply 39. The power circuit 36 shown in FIG. 3 is merely an exemplary embodiment, and may vary. Although not shown, the power circuit 36 may be achieved by excluding at least one of the elements shown in FIG. 3, or including additional elements not depicted in FIG. 3.

The rectifying smoother 30 rectifies a current output from input AC power 50, thereby converting alternating current (AC) into direct current (DC) and smoothing the converted DC voltage. The rectifying smoother 30 may, for example, include a bridge diode 49 for rectification, and a smoothing capacitor for smoothing.

The switching circuit 31 may include a transformer 48 that induces an activating voltage Vout in a secondary coil 59 by applying the input voltage Vin rectified in the rectifying smoother 30 to a primary coil 58. The activating voltage Vout refers to a voltage of actuating power supplied from the power supply 24 to the controller 23 and the like. As shown in FIG. 3, the switching circuit 31 may further include a switch 57 connected in series to the primary coil 58 and intermitting flow of the current, a diode 60 provided at a side of the secondary coil 59 and rectifying the activating voltage Vout, and a capacitor 61 maintaining a level of the activating voltage Vout. The activating voltage may have two or more levels. If the activating voltage has a plurality of levels, the switching circuit 31 may include the same or similar elements as the secondary coils 59, the diode 60 and the capacitor 61, corresponding to the respective levels of the activating voltage. In such a scenario, the levels of the activating voltage may be different depending on the respective elements. Using the switching circuit 31, the activating voltage having a level required for the system can be output.

The feedback provider 33 may feed the level of the activating voltage Vout to the power IC 56 so as to control the level of the activating voltage Vout. The feedback provider 33 may include feedback resistors 64 and 65 to provide feedback on the level of the activating voltage Vout. The feedback provider 33 may include a photo-coupler 62 to provide a feedback voltage Vfb on the activating voltage Vout to the power IC 56. The feedback provider 33 may include an error amplifier 63 to provide the feedback voltage Vfb based on a reference voltage. The feedback provider 33 may further include a capacitor 66 to stably provide the feedback voltage Vfb to the power IC 56.

The power IC 56 controls the switching circuit 31 so that the level of the actuating power can reach a target level, based on the feedback voltage Vfb received from the feedback provider 33. The power IC 56 may include a PWM controller 77 (shown in FIG. 4) to control the switching circuit 31. The PWM controller 77 may control the switching circuit 31 so that the level of the activating voltage Vout can reach the target level by the PWM mode.

The auxiliary power supply 39 supplies the auxiliary voltage Vcc needed for actuating the power IC 56. The auxiliary power supply 39 may include an auxiliary coil 69 that induces the auxiliary voltage Vcc, when the input voltage Vin is applied to the primary coil 58 in the normal mode of the display apparatus 2. The auxiliary power supply 39 may further include a diode 68 that is provided at the side of the auxiliary coil 69 and rectifies the auxiliary voltage Vcc, and a capacitor 67 that maintains the level of the auxiliary voltage Vcc. As an alternative exemplary embodiment, the auxiliary power supply 39 may be charged with an internal current source in the standby mode of the display apparatus 2, and outputs the auxiliary voltage Vcc, thereby supplying power needed for controlling a switching operation of the switch 57.

The noise reducer 37 reduces high-frequency noise caused by the switching operation of the switch 57, which is turned on or off to make electric current selectively flow in the primary coil 58. The noise reducer 37 may, for example, include a capacitor 55.

The discharging circuit 35 makes the current from the power circuit 36 flow to the power IC 56 along a discharging path (hereinafter, referred to as a 'path') formed by the diodes 51, 52 and the resistors 53, 54, connected to both terminals of the AC power 50.

Below, the power IC 56 will be described in more detail with reference to FIG. 4.

The discharging circuit 35 includes a first diode portion 51, a second diode portion 52, a first resistor 53 and a second resistor 54. The discharging circuit 35 may further include a first HV Start_Up pin 71, a second HV Start_Up pin 72, a J_FET 73, a charger/discharger 74, a charging capacitor 75, a transistor 76, a PWM controller 77 and GND pins 78 and 79. Some elements of the discharging circuit 35 may, for example, be provided in the power IC 56.

As shown in FIG. 3, the first diode portion 51 and the second diode portion 52 are respectively connected to both terminals of the AC power 50, thereby forming the discharging path for the residual voltage of the noise reducer 37. The first diode portion 51 and the second diode portion 52 are respectively connected to the first HV Start_Up pin 71 and the second HV Start_Up pin 72 via the first resistor 53 and the second resistor 54, as shown in FIG. 4. If the AC power 50 is input having a polarity of (+) to the first diode portion 51 and a polarity of (−) to the second diode portion 52, the current of the AC power 50 flows in the first HV Start_Up pin 71 via the first diode portion 51 and a current of a rectifying smoother 49 flows in the second HV Start_Up pin 72 via the second diode portion 52. On the other hand, if the AC power 50 is input having a polarity of (−) to the first diode portion 51 and a polarity of (+) to the second diode portion 52, the current of the rectifying smoother 49 flows in the first HV Start_Up pin 71 via the first diode portion 51 and the current of the AC power 50 flows in the second HV Start_Up pin 72 via the second diode portion 52.

The J_FET 73 may shut off the current flowing therein if power (voltage or current) received through the first HV Start_Up pin 71 and the second HV Start_Up pin 72 exceeds a predetermined threshold. Referring to FIG. 4, J_FET 73 may for example have an offset voltage of 25V, and the current may shut off if an input voltage exceeds 25V.

Figure 5:
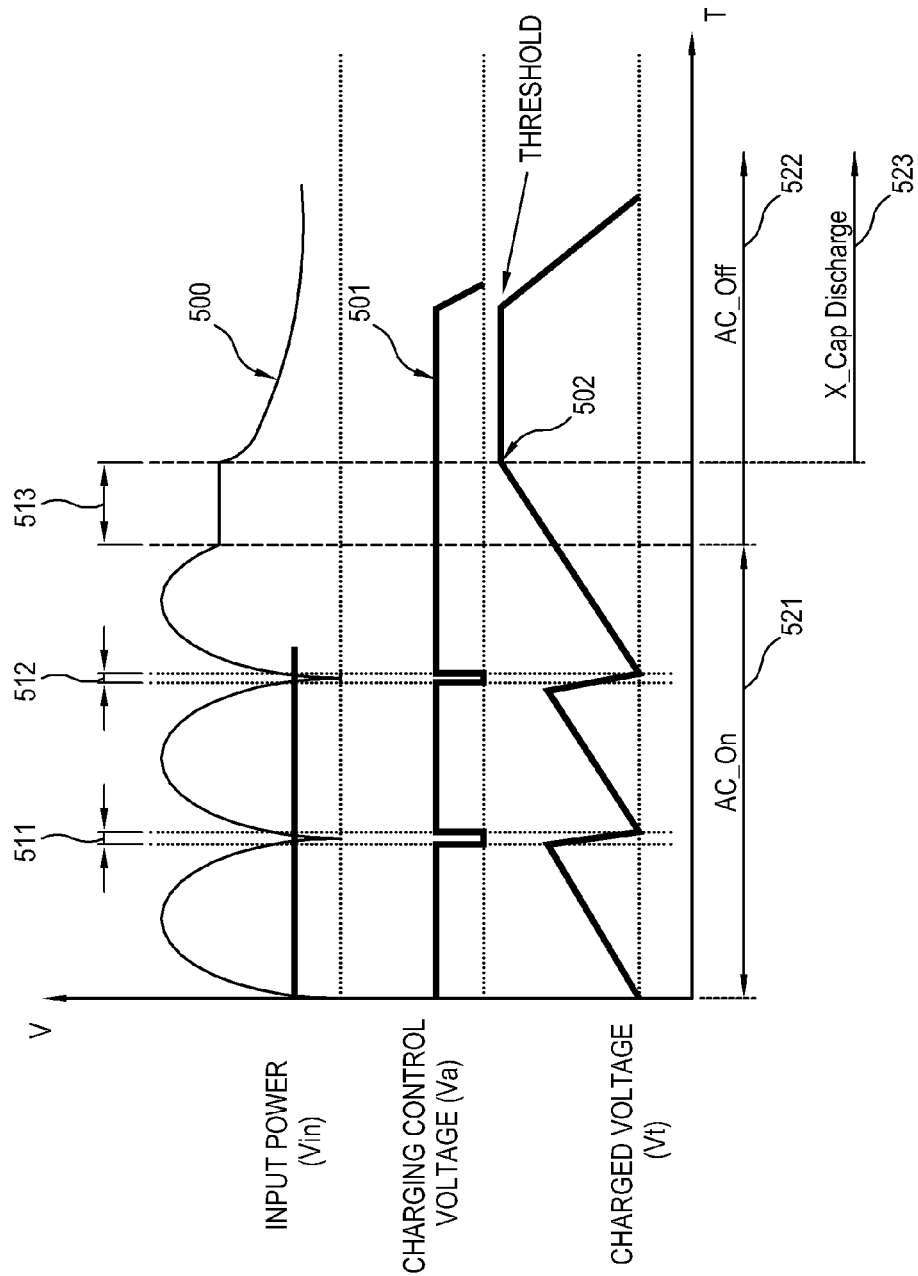
FIG. 5 shows a waveform of voltage change in major parts of FIG. 3, according to an exemplary embodiment.

The charger/discharger 74 charges the charging capacitor 75 in sync with the cycle of the AC power 50 when the AC power 50 is input, and discharges the power charged in the charging capacitor 75. FIG. 5 shows waveforms of signals in the power supply 24, according to an exemplary embodiment. From top to bottom, three waveforms shown in FIG. 5 respectively refer to an input power Vin obtained by rectifying the AC power 50 using the rectifying smoother 30, a charging control voltage Va, used for determining whether to charging the charging capacitor 75, and a voltage Vt charged in the charging capacitor 75.

As shown in FIG. 5, the charger/discharger 74 outputs the charging control voltage Va if the level of the input power Vin is equal to or higher than a predetermined level in section 521, where the AC power 50 is input, and generates a reset signal to shut off the charging control voltage Va in sections 511 and 512, where the level of the input power Vin is lower than the predetermined level. While the charging control voltage Va is output, the charging capacitor 75 is being charged. FIG. 5 depicts the threshold 501 of the charging control voltage (Va). On the other hand, while the charging control voltage Va is not output, the capacitor 75 stops getting charged, thereby discharging the charged voltage Vt from the capacitor 75.

The charger/discharger 74 can repetitively generate a reset signal in accordance with the cycle of the AC power 50 during section 521, where the AC power 50 is input. Therefore, the level of the voltage Vt increases while the charging capacitor 75 is being charged during section 521, where the AC power 50 is input, but does not exceed a threshold 502, since the voltage Vt is discharged during the sections 511 and 512, where the reset signal is generated. The charger/discharger 74 may flow a current of the charged voltage Vt to GND pin 78 so that the charging capacitor 75 can be discharged.

The transistor 76 makes the current introduced through the discharging path of the discharging circuit 35 be supplied to the PWM controller 77, when the AC power 50 is input. Referring to FIG. 4, the transistor 76 includes a collector connected to a first junction between the J_FET 73 and the charger/discharger 74, and an emitter connected to GND 79. Furthermore, the collector of the transistor 76 is connected to the PWM controller 77 via a diode. The transistor 76 includes a base connected to the charger/discharger 74, and thus the charged voltage Vt of the charging capacitor 75 is applied to the base of the transistor 76. The transistor 76 is turned off when the level of the charged voltage Vt applied to the base is lower than the threshold 502. In such a scenario, the current introduced into the discharging path of the discharging circuit 35 via the first junction flows to the PWM controller 77 via the diode without passing through the transistor 76. The PWM controller 77 is actuated by the current introduced through the discharging circuit 35. Accordingly, the current introduced through the discharging path of the discharging circuit 35 is provided as the power for activating the PWM controller 77, even though the AC power 50 is being input, thereby reducing wasteful power consumption and improving power efficiency.

Next, operations will be described when the AC power 50 is not input, i.e. in a section 522 where the AC power 50 is shut off. Referring to FIGS. 3 and 4, in the section 522 where the AC power 50 is shut off, a current based on the residual voltage of the noise reducer 37 may be introduced into the discharging path of the discharging circuit 35. The charger/discharger 74 and the transistor 76 make the current introduced into the discharging path of the discharging circuit 35 flow to the ground in section 522, where the AC power is shut off, thereby discharging the residual voltage of the noise reducer 37. For example, referring to FIG. 5, the section 522, where the AC power 50 is shut off, includes a section 513 where there is little change in the level of the input voltage Vin due to the residual voltage of the noise reducer 37. In such a scenario, the level of the input power Vin does not decrease to a predetermined level, and therefore the charger/discharger 74 does not generate the reset signal any more. Since the output of the charging control voltage Va is maintained and the charging capacitor 75 is continuously charged, the level of the charged voltage Vt continuously increases and reaches the threshold 502. At this time, the transistor 76 is turned on when the level of the charged voltage Vt applied to the base is equal to or higher than the threshold 502. Therefore, the current introduced into the discharging path of the discharging circuit 35 via the first junction flows to GND 79 via the transistor 76 without flowing in the PWM controller 77. As a result, it is possible to discharge the residual voltage of the noise reducer 37. Therefore, the residual voltage of the noise reducer 37 is rapidly discharged during the section 522, where the AC power 50 is shut off, thereby preventing malfunctioning of the display apparatus 2 and assuring user's safety. After section 513, the input voltage Vin drops sharply 500, which corresponds to section 523 representing the section where the capacitor discharges, as depicted in FIG. 5.

Figure 4:
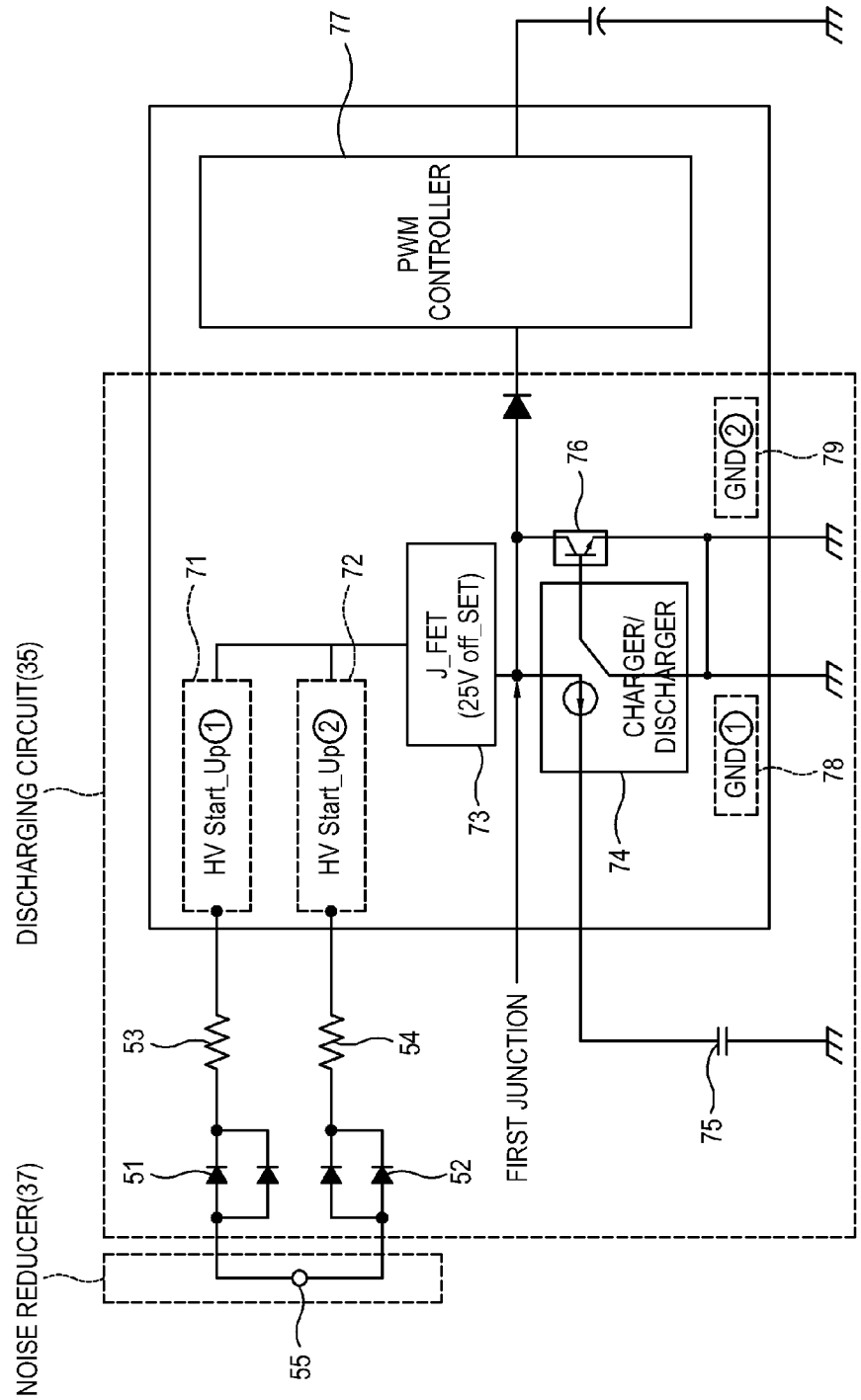
FIG. 4 is a block diagram of a power IC shown in FIG. 3, according to an exemplary embodiment.

The power IC shown in FIG. 4 is merely an exemplary embodiment. Although it is not illustrated in FIG. 4, the power IC may exclude some of the elements shown in FIG. 4, or may include additional elements not depicted in FIG. 4.

Figure 6:
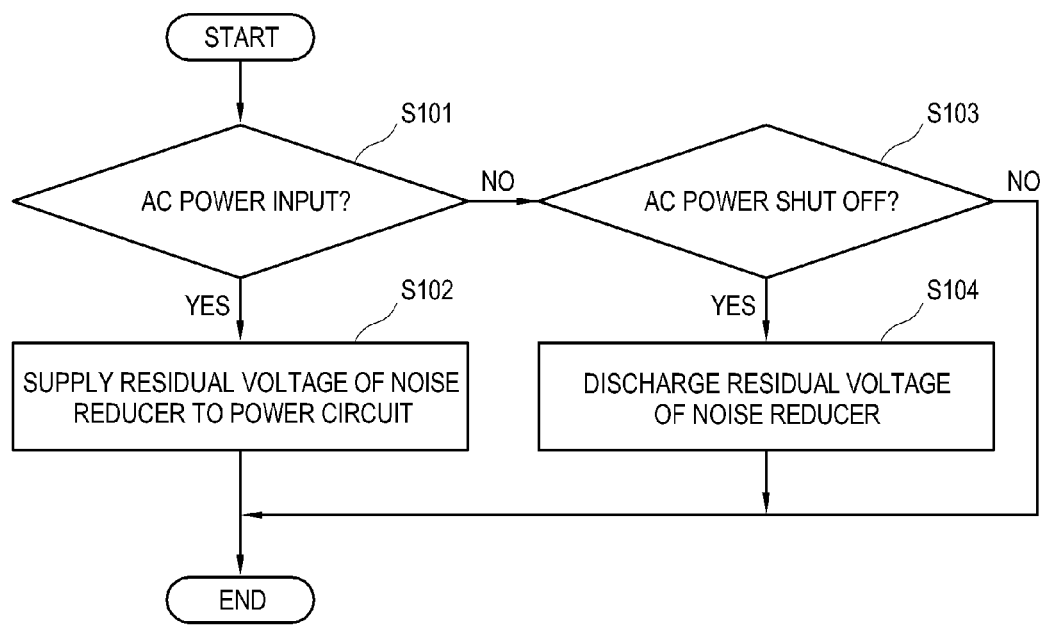
FIG. 6 is a flowchart showing a discharging operation, according to an exemplary embodiment.

FIG. 6 is a flowchart showing discharging operations of the power supply 24 according to an exemplary embodiment. Below, the operations of the power supply 24 will be described with reference to FIG. 6.

First, at operation S101, the power supply 24 determines whether the AC power is input. If the AC power is input, at operation S102 the residual voltage of the noise reducer 37 is supplied to the power circuit 36. If the AC power is not input, at operation S103 it is determined whether the AC power is shut off. If the AC power is shut off, at operation S104 the residual voltage of the noise reducer 37 is discharged.

Accordingly, the display apparatus 2, according to an exemplary embodiment, discharges the residual voltage of the noise reducer 37 while reducing the power consumption, preventing malfunctioning of the display apparatus 2, and assuring user's safety.

Although a few exemplary embodiments have been shown and described, all suitable modification and equivalents may fall within the scope of an exemplary embodiment of the inventive concept defined by the appended claims. For example, the foregoing exemplary embodiment describes that the power supply 24 is provided as an element of the display apparatus 2. However, according to an alternative exemplary embodiment, the display apparatus 2 may receive activating voltage from a separate power supply apparatus having the same or similar elements as the power supply 24. Further, the power supply apparatus according to an exemplary embodiment may supply the activating voltage to not only the display apparatus 2 but also various electronic apparatuses that need the activating voltage.

As described above, according to an exemplary embodiment, when the actuating power is supplied to the display apparatus or similar electronic apparatuses, it is possible to minimize power consumption due to increase in standby power if the residual voltage is discharged as the power cord is pulled out.

What is claimed is:

1. A display apparatus comprising:
an image processor configured to process an image signal;
a display configured to display an image based on the image signal;
a controller configured to control the display of the image; and
a power supply configured to supply actuating power to the controller,
the power supply comprising:
a power circuit configured to receive alternating current (AC) power when the AC power is input and output the actuating power using a switching mode;
a noise reducer configured to reduce high-frequency noise due to the switching mode; and
a discharging circuit configured to:
when the AC power is input, charge a charging capacitor based on an input voltage of the AC power, and if a level of the input voltage is lower than a first threshold level, discharge the voltage charged in the charging capacitor, and
when the AC power is shut off, charge the charging capacitor based on the residual voltage of the noise reducer, and if the voltage charged in the charging capacitor has a level equal to or higher than a second threshold level, discharge a residual voltage of the noise reducer when the AC power is shut off,
wherein the second threshold level is higher than the first threshold level.

2. The display apparatus according to claim 1, wherein the power circuit further comprises a pulse width modulation (PWM) controller configured to control output of the actuating power using a PWM mode, wherein
the controller is further configured to supply the residual voltage of the noise reducer to the PWM controller when the AC power is input.

3. The display apparatus according to claim 2, wherein the discharging circuit and the PWM controller are combined on a single integrated chip (IC).

4. The display apparatus according to claim 1, wherein the discharging circuit comprises a charger/discharger configured to charge the charging capacitor with the residual voltage of the noise reducer in sync with a cycle of the AC power when the AC power is input, and to discharge the power charged in the charging capacitor.

5. The display apparatus according to claim 1, wherein the discharging circuit comprises a transistor configured to turn off when the AC power is input, to supply the residual voltage of the noise reducer to the power circuit, to turn on when the AC power is shut off and the voltage charged in the charging capacitor has a level equal to or higher than the second level and to reduce the residual voltage of the noise reducer to a ground.

6. A power supply apparatus for supplying actuating power to a display apparatus, the power supply apparatus comprising:
a power circuit configured to receive alternating current (AC) power when the AC power is input and output the actuating power using a switching mode;
a noise reducer configured to reduce high-frequency noise due to the switching mode; and
a discharging circuit configured to:
when the AC power is input, charge a charging capacitor based on an input voltage of the AC power, and if a level of the input voltage is lower than a first threshold level, discharge the voltage charged in the charging capacitor, and
when the AC power is shut off, charge the charging capacitor based on the residual voltage of the noise reducer, and if the voltage charged in the charging capacitor has a level equal to or higher than a second threshold level, discharge a residual voltage of the noise reducer,
wherein the second threshold level is higher than the first threshold level.

7. The power supply apparatus according to claim 6, wherein the power circuit further comprises a pulse width modulation (PWM) controller configured to control output of the actuating power using a PWM mode.

8. The power supply apparatus according to claim 7, wherein the discharging circuit and the PWM controller are combined on a single integrated chip (IC).

9. The power supply apparatus according to claim 6, wherein the discharging circuit comprises a charger/discharger configured to charge the charging capacitor with the residual voltage of the noise reducer in sync with a cycle of the AC power when the AC power is input, and to discharge the power charged in the charging capacitor.

10. The power supply apparatus according to claim 6, wherein the discharging circuit comprises a transistor configured to turn off when the AC power is input, to supply the residual voltage of the noise reducer to the power circuit, to turn on when the AC power is shut off and the voltage charged in the charging capacitor has a level equal to or higher than the second threshold level, and to reduce the residual voltage of the noise reducer to a ground.

11. A method of controlling a display apparatus which comprises a power supply for supplying actuating power and processes an image signal to display an image,
the power supply comprising:
a power circuit configured to receive alternating current (AC) power when the AC power is input and output the actuating power using a switching mode;
a noise reducer configured to reduce high-frequency noise due to the switching mode; and
a discharging circuit, and
the method comprising:
charging, by the discharging circuit, a charging capacitor based on an input voltage of the AC power while the AC power is input to the power circuit;
discharging, by the discharging circuit, the voltage charged in the charging capacitor if a level of the input voltage is lower than a first threshold level while the AC power is input to the power circuit;

charging, by the discharging circuit, the charging capacitor based on the residual voltage of the noise reducer when the AC power is shut off to the power circuit; and discharging, by the discharging circuit, a residual voltage of the noise reducer when the AC power is shut off to the power circuit and the voltage charged in the charging capacitor has a level equal to or higher than a second threshold level, wherein the second threshold level is higher than the first threshold level.

12. The method according to claim 11, wherein the supplying the residual voltage of the noise reducer further comprises charging the charging capacitor of the discharging circuit with the residual voltage of the noise reducer in sync with a cycle of the AC power when the AC power is input, and discharging the power charged in the charging capacitor.

13. A method of controlling a power supply apparatus which comprises a power supply and supplies actuating power to a display apparatus processing an image signal and displaying an image, the power supply comprising:
a power circuit configured to receive alternating current (AC) power when the AC power is input and output the actuating power using a switching mode;
a noise reducer configured to reduce high-frequency noise due to the switching mode; and
a discharging circuit, and the method comprising:
charging, by the discharging circuit, a charging capacitor based on an input voltage of the AC power while the AC power is input to the power circuit;
discharging, by the discharging circuit, the voltage charged in the charging capacitor if a level of the input voltage is lower than a first threshold level while the AC power is input to the power circuit;
charging, by the discharging circuit, the charging capacitor based on the residual voltage of the noise reducer when the AC power is shut off to the power circuit; and
discharging, by the discharging circuit, a residual voltage of the noise reducer, when the AC power is shut off to the power circuit and the voltage charged in the charging capacitor has a level equal to or higher than a second threshold level, wherein the second threshold level is higher than the first threshold level.

14. The method according to claim 13, wherein the supplying the residual voltage of the noise reducer comprises charging the charging capacitor of the discharging circuit with the residual voltage of the noise reducer in sync with a cycle of the AC power when the AC power is input, and discharging the power charged in the charging capacitor.

15. A method of controlling a power supply apparatus comprising:
determining noise of a power source using a noise reducer and generating a residual voltage,
when alternating current (AC) power is being input, charging a charging capacitor based on an input voltage of the AC power, and if a level of the input voltage is lower than a first threshold level, discharging the voltage charged in the charging capacitor; and
when the AC power is shut off, charging the charging capacitor based on the residual voltage of the noise reducer, and if the voltage charged in the charging capacitor has a level equal to or higher than a second threshold level, discharging the residual voltage,
wherein the second threshold level is higher than the first threshold level.

\* \* \* \* \*